(12) United States Patent
Saito et al.

(10) Patent No.: US 10,897,695 B2
(45) Date of Patent: *Jan. 19, 2021

(54) PERSONAL SECURITY SYSTEM

(71) Applicant: Rave Wireless, Inc., Framingham, MA (US)

(72) Inventors: Ghen Saito, Maplewood, NJ (US); Rodger Desai, Piscataway, NJ (US); Raju Rishi, Piscataway, NJ (US)

(73) Assignee: Rave Wireless, Inc., Framingham, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/774,489

(22) Filed: Jan. 28, 2020

(65) Prior Publication Data

US 2020/0162881 A1 May 21, 2020

Related U.S. Application Data

(63) Continuation of application No. 16/248,093, filed on Jan. 15, 2019, now Pat. No. 10,582,364, which is a
(Continued)

(51) Int. Cl.
*G08B 25/00* (2006.01)
*H04M 1/725* (2006.01)
(Continued)

(52) U.S. Cl.
CPC ............ *H04W 4/90* (2018.02); *G08B 25/009* (2013.01); *G08B 25/016* (2013.01); *G08B 25/10* (2013.01);
(Continued)

(58) Field of Classification Search
CPC . H04W 4/90; H04W 4/029; H04W 12/00503; H04W 12/00502; H04W 8/10; H04W 4/02; H04W 12/02; H04M 1/7258; H04M 1/72519; H04L 63/107; H04L 63/20; G08B 25/016; G08B 25/10; G08B 25/009
See application file for complete search history.

(56) References Cited

U.S. PATENT DOCUMENTS

| 4,643,462 A | 2/1987 | Wallace |
| 5,710,803 A | 1/1998 | Kowal et al. |
| (Continued) | | |

OTHER PUBLICATIONS

International Search Report (PCT/US07/64273) dated Oct. 10, 2007; 2 pages.

*Primary Examiner* — Joseph E Dean, Jr.
(74) *Attorney, Agent, or Firm* — Occhiuti & Rohlicek LLP

(57) ABSTRACT

A method for providing assistance to each of a plurality of users, each having been enrolled as a member of a community includes receiving, at a server, communications from corresponding mobile devices, each of which is associated with a user who has enrolled as a member in a first community. These emergency communications were initiated by activation of respective personal security buttons on the mobile devices, and provide information about respective security conditions. In response to the communications, the server alerts corresponding first and second security services that are appropriate responding to the respective security conditions.

20 Claims, 2 Drawing Sheets

Related U.S. Application Data continuation of application No. 15/805,636, filed on Nov. 7, 2017, now Pat. No. 10,182,332, which is a continuation of application No. 15/332,067, filed on Oct. 24, 2016, now Pat. No. 9,813,885, which is a continuation of application No. 15/054,544, filed on Feb. 26, 2016, now Pat. No. 9,503,876, which is a continuation of application No. 14/748,721, filed on Jun. 24, 2015, now Pat. No. 9,277,389, which is a continuation of application No. 13/440,319, filed on Apr. 5, 2012, now Pat. No. 9,071,643, which is a continuation of application No. 11/687,818, filed on Mar. 19, 2007, now abandoned.

(60) Provisional application No. 60/784,276, filed on Mar. 20, 2006.

(51) Int. Cl.
| | |
|---|---|
| *G08B 25/01* | (2006.01) |
| *H04W 12/00* | (2009.01) |
| *H04L 29/06* | (2006.01) |
| *H04W 4/90* | (2018.01) |
| *H04W 4/029* | (2018.01) |
| *H04W 12/02* | (2009.01) |
| *H04W 8/10* | (2009.01) |
| *H04W 4/02* | (2018.01) |
| *G08B 25/10* | (2006.01) |

(52) U.S. Cl.
CPC ............ *H04L 63/107* (2013.01); *H04L 63/20* (2013.01); *H04M 1/7258* (2013.01); *H04M 1/72519* (2013.01); *H04W 4/02* (2013.01); *H04W 4/029* (2018.02); *H04W 8/10* (2013.01); *H04W 12/02* (2013.01); *H04W 12/00502* (2019.01); *H04W 12/00503* (2019.01)

(56) References Cited

U.S. PATENT DOCUMENTS

| | | |
|---|---|---|
| 5,787,429 A | 7/1998 | Nikolin |
| 5,805,670 A | 9/1998 | Pons et al. |
| 5,808,564 A | 9/1998 | Simms et al. |
| 6,353,398 B1 | 3/2002 | Amin et al. |
| 6,480,725 B2 | 11/2002 | Cassidy et al. |
| 6,560,456 B1 | 5/2003 | Lohtia et al. |
| 6,600,812 B1 | 7/2003 | Gentillin et al. |
| 6,643,355 B1 | 11/2003 | Tsumpes |
| 6,661,340 B1 | 12/2003 | Saylor et al. |
| 6,696,956 B1 | 2/2004 | Uchida et al. |
| 6,973,166 B1 | 12/2005 | Tsumpes |
| 7,026,928 B1 | 4/2006 | Lane |
| 7,038,590 B2 | 5/2006 | Hoffman et al. |
| 7,042,338 B1* | 5/2006 | Weber .................. G08B 5/223 340/309.16 |
| 7,046,140 B2 | 5/2006 | Adamczyk et al. |
| 7,068,189 B2 | 6/2006 | Brescia |
| 7,130,389 B1 | 10/2006 | Rodkey et al. |
| 7,149,533 B2 | 12/2006 | Laird et al. |
| 7,174,005 B1 | 2/2007 | Rodkey et al. |
| 7,212,111 B2 | 5/2007 | Tupler et al. |
| 7,312,712 B1 | 12/2007 | Worrall |
| 7,362,852 B1 | 4/2008 | Rodkey et al. |
| 7,770,229 B2 | 8/2010 | Upendran |
| 9,813,885 B2 | 11/2017 | Saito et al. |
| 10,182,332 B2 | 1/2019 | Saito et al. |
| 2001/0026221 A1 | 10/2001 | Toyota |
| 2002/0102996 A1 | 8/2002 | Jenkins |
| 2002/0107927 A1 | 8/2002 | Gallant |
| 2002/0142813 A1 | 10/2002 | Cassidy et al. |
| 2003/0041107 A1 | 2/2003 | Blattner et al. |
| 2004/0190720 A1 | 9/2004 | Harvey |
| 2004/0198315 A1 | 10/2004 | Vellotti |
| 2004/0225681 A1 | 11/2004 | Chaney et al. |
| 2005/0003797 A1* | 1/2005 | Baldwin ................ H04W 4/90 455/404.1 |
| 2005/0009536 A1 | 1/2005 | Ito et al. |
| 2005/0070247 A1 | 3/2005 | Larson |
| 2005/0170810 A1 | 8/2005 | Choi et al. |
| 2005/0176402 A1 | 8/2005 | Verloop |
| 2006/0263022 A1 | 11/2006 | Han |
| 2007/0072583 A1 | 3/2007 | Barbeau |
| 2007/0093234 A1 | 4/2007 | Willis et al. |
| 2007/0149214 A1 | 6/2007 | Walsh et al. |
| 2007/0190512 A1 | 8/2007 | Meimer et al. |
| 2007/0288758 A1 | 12/2007 | Weiss |
| 2008/0188198 A1 | 8/2008 | Patel et al. |

* cited by examiner

PERSONAL SECURITY SYSTEM

CROSS-REFERENCE TO RELATED APPLICATIONS

The following applications are related to the present application by either 35 USC 120 or 25 USC 119.
- U.S. application Ser. No. 16/248,093, filed on Jan. 15, 2019, and allowed on Oct. 17, 2019.
- U.S. application Ser. No. 15/805,636, filed on Nov. 7, 2017, and which issued on Jan. 15, 2019 as U.S. Pat. No. 10,182,332.
- U.S. application Ser. No. 15/332,067, filed on Oct. 24, 2016, and which issued on Nov. 7, 2017 as U.S. Pat. No. 9,813,885.
- U.S. application Ser. No. 15/054,544, filed on Feb. 26, 2016, and which issued on Nov. 22, 2016 as U.S. Pat. No. 9,503,876.
- U.S. application Ser. No. 14/748,721, filed on Jun. 24, 2015, and which issued on Mar. 1, 2016 as U.S. Pat. No. 9,277,389.
- U.S. application Ser. No. 13/440,319, which was filed on Apr. 5, 2012, and which issued on Jun. 30, 2015 as U.S. Pat. No. 9,071,643.
- U.S. application Ser. No. 11/687,818, which was filed on Mar. 19, 2007, and abandoned.
- U.S. Provisional Application No. 60/784,276, Mar. 20, 2006 priority date of which was filed on Mar. 20, 2006.

The relationships between the above applications are set forth below. The applications are identified by serial number for brevity. Full bibliographic information is contained in the above list. Where a first application that "is a continuation" of a second, the applications in question are related by 35 USC 120. Where a first application "is a non-provisional" of a second, the applications are related by 35 USC 119.

This application is a continuation of Ser. No. 16/248,093.
Ser. No. 16/248,093 is a continuation of Ser. No. 15/805,636.
Ser. No. 15/805,636 is a continuation of Ser. No. 15/332,067.
Ser. No. 15/332,067 is a continuation of Ser. No. 15/054,544.
Ser. No. 15/054,544 is a continuation of Ser. No. 14/748,721.
Ser. No. 14/748,721 is a continuation of Ser. No. 13/440,319.
Ser. No. 13/440,319 is a continuation Ser. No. 11/687,818.
Ser. No. 11/687,818 is a non-provisional of 60/784,276.

The contents of the foregoing applications are incorporated herein by reference.

FIELD OF INVENTION

This invention relates to a system for personal security.

BACKGROUND

Cellular telephone systems today typically provide some sort of location tracking of users, for example, to determine the location of a user that dials an emergency number (e.g., using E911). In some communities of users, such as students on a university campus, use of cellular telephones has become ubiquitous, with users using text messaging and other applications to stay "connected."

SUMMARY

In one aspect, the invention features a method comprising receiving, at a communication server, a communication concerning a personal mobile handset that is coupled to a mobile communication system and that is associated with a corresponding user of the mobile communication system. The user is one who has been enrolled as a member of a first community. The communication server is one that has been configured to initiate communication with each security service from a set of security services. The method includes causing the communication server to select a first security service from the set of security services based on a location from which the communication originated and to inform the first security service of the call.

Some practices also include transmitting at least some information received by the first security service to a police department associated with the location from which the communication originated.

Other practices include causing the communication server to query a location-based server to determine the location from which the communication originated.

Still other practices include selecting the first community to be an association of users, each of whom is entitled to receive emergency services from the first security service as a result of having been enrolled in the first community.

In some practices, the first community is a university and the first security service is a campus police department of the university.

In other practices, the location from which the communication originated is outside of a geographic area associated with the first community.

Among the practices are those in which the mobile device has been configured by downloaded software to provide a personal security button that provides one-touch access to the first security-service. In such practices, receiving the communication includes receiving a communication that is a result of the user having actuated the personal security button.

8. The method of claim 1, further comprising, at the communication server, receiving, from a location-based server, information that is maintained by the communication system and that is indicative of the location from which the communication originated, the information having been accessed by the location-based server.

Yet other practices of the invention include having the communication server receive, from a location-based server, information that results from the location-based server having queried the communication system to obtain information indicative of the location from which the communication originated.

Still other practices include a step prior to origination of the call. Among these are those in which the step is that of receiving, at the communication server, enrollment information provided by the first user. This enrollment information identifies the first community. Also among these are practices in which the step is that of receiving, at the communication server, enrollment information from the first community, the enrollment information having been provided to the first community by the first user. Also among these practices are those in which the step is that of receiving, at the communication server, information identifying personal mobile handsets associated with the first community, the information having been provided to the communication server by the first community.

Practices include those in which the first security service is a security service that is associated with a community other than that in which the user is enrolled and those in which it is that is associated with the community in which the user is enrolled.

The security service does not have to be a police department. For example, other practices include those in which the security services include a parent, a caregiver, or both.

Practices also include those in which receiving the communication at the communication server comprises receiving the communication via a wireless network.

In some practices, the received communication is indicative of an upcoming time interval during which the user has an expectation of heightened risk.

In another aspect, the invention features a manufacture comprising a non-transitory and tangible computer-readable medium having encoded thereon instructions for causing a data-processing system to receive, at a communication server, a communication concerning a personal mobile handset that is coupled to a mobile communication system and that is associated with a corresponding user of the mobile communication system, the user having been enrolled as a member of a first community, the communication server having been configured to initiate communication with each security service from a set of security services and to cause the communication server to select a first security service from the set of security services based on a location from which the communication originated and to inform the first security service of the call.

Among the embodiments are those in which the computer-readable medium is distributed such that instructions thereon are executed by different devices.

In yet another aspect, the invention features a communication server that is configured to receive a communication concerning a personal mobile handset that is coupled to a mobile communication system and that is associated with a corresponding user of the mobile communication system, the user having been enrolled as a member of a first community, the communication server having been configured to initiate communication with each security service from a set of security services and to cause the communication server to select a first security service from the set of security services based on a location from which the communication originated and to inform the first security service of the call.

All methods and systems disclosed herein are non-abstract implementations. Descriptions of abstract implementations have been omitted. The claims are therefore to be construed to cover only non-abstract embodiments.

These and other features and advantages of the invention will be apparent from the following detailed description and the accompanying figures in which:

DETAILED DESCRIPTION

Figure 1:
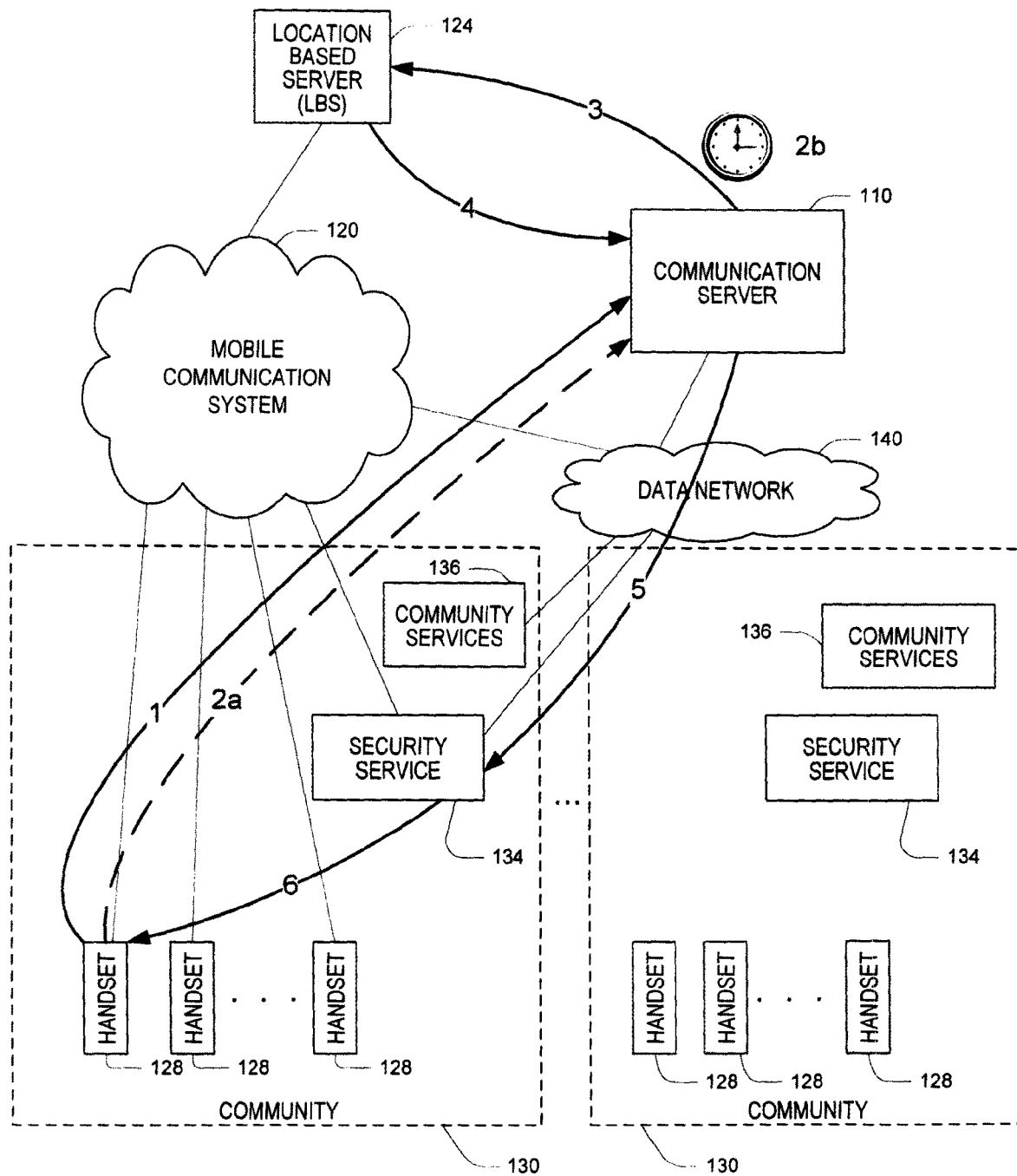
FIG. 1 is a block diagram of a personal security system.

Referring to FIG. 1, a personal security system makes use of personal mobile handsets 128 coupled to a mobile communication system 120. Each handset 128 is associated with a corresponding user of the system. In some examples, the handsets 128 are cellular telephones that are coupled by a mobile telephone system, such as a GSM, CDMA, or an iDEN based system.

The system makes use of a communication server 110, one function of which is to determine when a security situation may exist for one of the users and to then alert an appropriate security service 134. The security service 134 then determines if there is truly a security situation, for example, by communicating with the user over the handset 128 or investigating in person.

In order to aid the security service 134, examples of the system make use of various types of location-based services. In some embodiments, the mobile-communication system 120 includes or has associated with it a location-based server 124 that is able to determine the location of a particular handset 128. The communication server 110 can query the location-based server 124 (e.g., as a software-based request over the Internet) to determine the location of a particular handset 128. Different examples of the security system make use of one or more types of location-determination approaches. One type of location-determination approach uses Global Positioning System (GPS) functionality that is built into the handset 128, optionally assisted by fixed elements of the mobile-communication system 120 in an Assisted GPS (AGPS) approach. Other location-determination approaches use signal strength and/or direction information in triangulation approaches based on transmitted or received radio signals from the mobile-communication system 120. Yet other approaches are based on cell identification in a cellular telephone network.

Some examples of the system provide services to multiple different communities 130 of users. An example of a community 130 is an association of users that is served by its own security service 134. A specific example of a community 130 is a university, with the security service 134 being the campus police service for that university. In such an example, different universities typically have separate campus police services.

The communities 130 need not be geographically separated. For example, urban universities may have student communities that are very close to one another (e.g., students of New York University and Columbia University). The users in such communities may operate in overlapping geographic regions. The system supports configurations in which the users are serviced by the security service 134 for their community 130, regardless of their actual geographic location.

In some examples, the personal security system supports a personal security button on the handset 128. Various approaches to configuring the handset 128 to provide such a button are possible, including through provisioning by the operator of the mobile-communication system 120 and by downloading software to a configurable device. For example, the "home" or "dashboard" screen of a mobile telephone can provide direct "one touch" access to security services.

When a user activates the personal security button, the handset 128 sends a message to the communication server 110. Various approaches to sending the message are used in different examples of the system. Some examples use a Short Message Service (SMS) provided through the mobile-communication system 120. When the communication server 110 receives the message, it queries the location-based server 124 to determine the location of the sending handset 128. In some examples the location-based server 124 already has access to location information for the handset 128 that is maintained by the communication system, while in other examples, it in turn queries the communication system which determines the handset's location. The location-based server 124 returns the handset's location to the communication server 110, which then contacts the appropriate security service 134 for the user's community.

Different examples of the system use various approaches to enrollment of users. In some approaches, a web-based approach is used in which a user provides enrollment information to the communication server 110. Such information includes an identification of the user's community 130 and, optionally, personal information that might be useful to the security service in an emergency. In other examples, the users enroll through a system operated by the community 130 and personal information is maintained privately within the community 130. The community 130 provides the communication server 110 with information identifying the handsets 128 within its community 130. Example of personal information that may be useful to a security service include a photograph of the user and physical data, such as the user's, gender, height, weight, hair color, and the like.

Some mobile-communication systems 120 require that a user authorize particular parties so that they can access their location information, for example, through the location-based server 124. In such systems, as part of the enrollment process the users provide the necessary authorization, which is communicated to the location-based server 124 and/or the mobile-communication system 120.

In some examples, the personal security system supports a mode that can be used when a user expects to be at some risk for an upcoming interval of time. For example, a university student may need to cross a campus late at night and feel at risk walking along isolated paths.

Some examples of such a mode use a timer-based approach. Generally, when the user is about to initiate an interval of time during which they may feel at risk, they initiate the timing of an interval by the security system. If the user "checks in" before the expiration of the interval, or alternatively in response to a prompt by the system at the end of the interval, the user is deemed to be safe. On the other hand, if the user fails to check-in or fails to respond to a prompt, or optionally if the handset 128 is not accessible from the communication system 120 during the interval, the security service for that user's community 130 is notified along with the last known location of the handset 128.

Referring to FIG. 1, a sequence of steps for a previously registered user of the system are described in such an example:

Step 1: The user notifies the communication server 110 that they are about to start an at-risk interval. In different examples, this step is carried out in a variety of ways. For example, the handset 128 may have a browser (e.g., a Wireless Application Protocol, WAP, browser) that accesses an application at the communication server 110 that provides a graphical interface for display on the handset 128. The graphical interface permits the user to enter the duration of the interval (or alternatively the end time of the interval). In some examples, the user has provided a Personal Identification Number (PIN) to be used to check-in. In other examples the user provides a check-in PIN at the start of the interval. In some examples, a software application has already been loaded on the handset 128, and the application sends data messages to the communication server 110 to initiate the interval. In other examples, communication techniques such as SMS, or voice based (e.g., using speech recognition) or touch-tone (DTMF) based interfaces are user by the user to inform the communication server 110 that the interval is about to start. In some examples, the communication between the handset 128 and the communication server 110 is direct, while in other examples, the communication is mediated by a system operated by the user's community 130. When the communication server 110 determines that the user has started an interval, it begins a count-down timer that will expire at the end of the interval.

Step 2a: Prior to the end of the interval, the user can communicate with the communication server 110 to check-in and terminate the interval. With PIN-based approaches, the user enters their secret PIN, which was recorded as part of a registration procedure, or was provided at the start of the interval. In some examples, the user has the option of entering a special PIN that indicates that they are in danger. For example, suppose an attacker forces a user to terminate the interval, the user can enter a special PIN, such a pre-arranged PIN or the normal PIN with a special suffix (e.g., adding a 1 at the end of the PIN). This can signal the communication server 110 that the user is in danger without alerting the attacker.

Step 2b: If at the end of the interval the user has not yet checked-in, the communication server 110 can act on the possibility that the user is in danger. In some examples, the server first communicates automatically with the user. For example, the server may interact with an application executing on the handset 128, send a SMS-based message that needs to be responded to, or may a telephone call requiring voice or text entry of the PIN.

Step 3: If the user has not checked in prior to the expiration of the planned interval, or has not responded to the prompt from the system at the end of the interval in examples that are configured to provide such a prompt, the communication server 110 requests location information for the user's handset 128.

Step 4: The location-based server 124 determines the last known location of the user, optionally with the time the location determination was made. The location-based server 124 then send this location information to the communication server 110. The location information may take various forms, such as latitude and longitude.

Step 5: The communication server 110 notifies the security service 134 for the user. In examples in which the communication server 110 serves many communities, the server has been configured with at least information identifying the particular security service 134 to notify (or alternatively, multiple security services 134 may be notified and only the one responsible for that handset 128 acts on the notification). In examples in which the communication server 110 has additional personal information related to the user (e.g., name, photo, etc.) it sends this information along with the notification. In examples in which the security service 134 has access to personal information for that user, it accesses that information in response to the notification.

Figure 2:
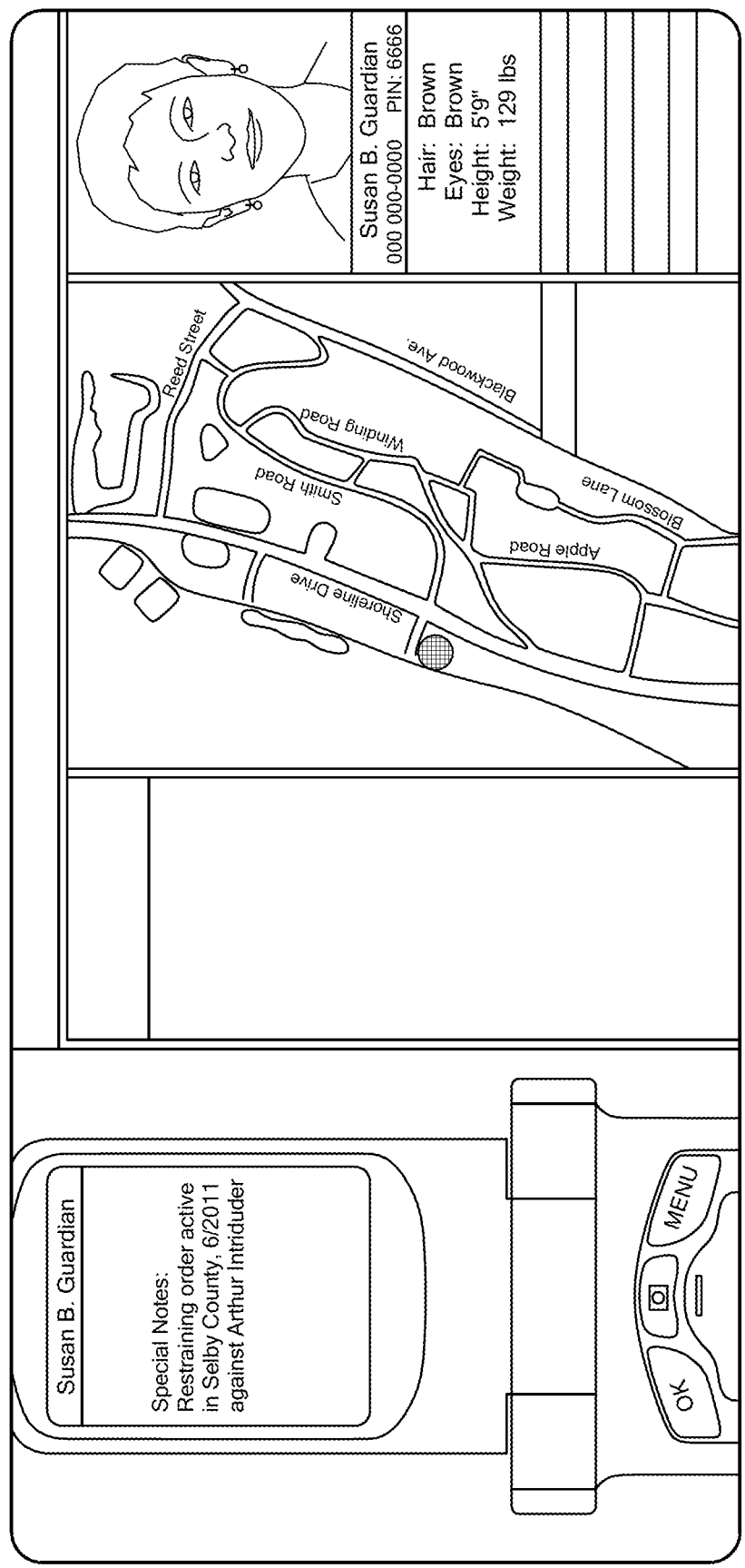
FIG. 2 is a graphical display for security personnel.

In some examples, security personnel, for example at a command station or at a mobile device for personnel on patrol, are provided with a display associated with the user and the current risk. For example, referring to FIG. 2, a graphical display with a map showing the user's location (or last known location), a photograph of the user, as well as text-based personal information are displayed to the security personnel.

Step 6: The security personnel attempt to interact with the user, for example, by calling their handset 128 to establish person-to-person communication, and/or by dispatching personnel to the user's location to provide assistance. When appropriate, the security service 134 may notify other security organizations, such as a local police department, to help handle the incident.

In some examples, when a user initiates an at-risk interval, the communication server 110 may initially inform the security service 134 and provide location information obtained from the location-based server 124 on an ongoing basis. The security service 134 can maintain a display, for example showing their locations on a map, of users as they travel. In some examples, users may have the option of permitting or denying such tracking, for example, for privacy reasons. A concentration of users in a particular area may be addressed by dispatching preventive patrols into the area. Also, historical information may be logged, for example, to identify areas and time in which users feel at risk or in which incidents actually occur. Such historical information may be used, for example, to improve users' sense of security in those areas, for example though physical improvements (e.g., lighting) or increased patrols.

In some examples, the security period may be defined using other and/or additional criteria than time duration or end time. For example, a user may identify a route (e.g., using a destination building number) and the security period is defined as the time until the user reaches the destination. In such an example, the end of the security period may be defined by the server as a reasonable time needed to reach the destination. In some examples, the communication server 110 may determine that there may be a possible security condition if the user deviates significantly from a path to the declared destination.

In some examples, security periods may be initiated or defined by entities other than the user. For example, a parent may require that a child check-in at a particular time, for example at midnight, or at a set of prespecified times, for example, every two hours. In addition or instead of notifying a security service 134, the parent may be notified if the child fails to check-in. That is, the parent may serve the role of the security service 134. Similarly, an elderly parent may need to check-in periodically or else their adult child or other caregiver is notified with information about their location. In some examples, a child may initiate the security period with the parent being notified if they fail to terminate the period or check-in when prompted.

In some examples, a security period may be initiated passively based on a user's activity. For example, a system may detect that a user has entered a predefined geographic area, such as a campus or a nursing home and that the user will have to check-in within a certain period of time, such as within an hour.

In some examples, the security service 134 of the user's community 130 is notified regardless of the user's geographic location. For example, a user from a university in California may be visiting New York City yet their security-related notifications are sent back to California. This approach can permit their university security service 134 to provide additional information to local New York police. In other examples, the security service 134 that is notified may depend on the user's geographic location. For example, universities may cooperate and a student visiting another university's campus may result in a notification to the security service 134 of the visited university in addition or instead of the user's home university.

In some examples, one communication server 110 may interact with multiple mobile-communication systems 120. For example, users in a single community 130 or in different communities 130 may be served by different mobile telephone carriers.

In some versions of the system, additional community services 136 may take advantage of the capabilities of the communication server 110. For example in a university situation, a community service 136 may include an academic group that provides class-related notifications (e.g., class cancellation, in-class surveys, etc.). Another community service 136 may include access to transportation information, such as campus bus routes, schedules, and expected arrival-time information. Other examples include broadcasting of campus-wide alerts, which may be security related.

In the description above, in some examples of the system a university student community 130 is provided as an example of users served by the system. Other examples of communities may be served by examples of the system. For example, personnel on a military base, a special interest group, a church group, residents of a housing development, inhabitants of cities, towns, hotel guests, etc. can each form a community 130 served by an example of a personal security system.

In some examples, capabilities described are implemented in software, which may be stored on computer readable media or embodied on signals propagating through communication media (e.g., over wired or wireless networks). The software may include instructions, such as machine instructions, programming language or interpreter statements, instructions for virtual machines (e.g., Java), or other forms of instructions. The software may be distributed, for example, with some components execution on the handsets 128 and other components executing at fixed servers.

It is to be understood that the foregoing description is intended to illustrate and not to limit the scope of the invention, which is defined by the scope of the appended claims. Other embodiments are within the scope of the following claims.

Having described the invention, and a preferred embodiment thereof, what is claim as new, and secured by letters patent is:

1. A method comprising receiving, at a communication server, a communication concerning a personal mobile handset that is coupled to a mobile communication system and that is associated with a corresponding user of said mobile communication system, said user having been enrolled as a member of a first community, said communication server having been configured to initiate communication with each security service from a set of security services and causing said communication server to select a first security service from said set of security services based on a location from which said communication originated and to inform said first security service of said call.

2. The method of claim 1, further comprising transmitting at least some information received by said first security service to a police department associated with said location from which said communication originated.

3. The method of claim 1, further comprising causing the communication server to query a location-based server to determine said location from which said communication originated.

4. The method of claim 1, further comprising selecting said first community to be an association of users, each of whom is entitled to receive emergency services from said first security service as a result of having been enrolled in said first community.

5. The method of claim 1, further comprising selecting said first community to be a university, wherein said first security service is a campus police department of said university.

6. The method of claim 1, wherein said location from which said communication originated is outside of a geographic area associated with said first community.

7. The method of claim 1, wherein said mobile device has been configured by downloaded software to provide a personal security button that provides one-touch access to said first security-service, wherein receiving said communication comprises receiving a communication that is a result of said user having actuated said personal security button.

8. The method of claim 1, further comprising, at said communication server, receiving, from a location-based server, information that is maintained by said communication system and that is indicative of said location from which said communication originated, said information having been accessed by said location-based server.

9. The method of claim 1, further comprising, at said communication server, receiving, from a location-based server, information that results from said location-based server having queried said communication system to obtain information indicative of said location from which said communication originated.

10. The method of claim 1, further comprising, prior to origination of said call, receiving, at said communication server, enrollment information provided by said first user, said enrollment information identifying said first community.

11. The method of claim 1, further comprising, prior to origination of said call, receiving, at said communication server, enrollment information from said first community, said enrollment information having been provided to said first community by said first user.

12. The method of claim 1, further comprising, prior to origination of said call, receiving, at said communication server, information identifying personal mobile handsets associated with said first community, said information having been provided to said communication server by said first community.

13. The method of claim 1, wherein said security services include a parent and a caregiver.

14. The method of claim 1, wherein receiving said communication at said communication server comprises receiving said communication via a wireless network.

15. The method of claim 1, wherein said communication is indicative of an upcoming time interval during which said user has an expectation of heightened risk.

16. The method of claim 1, further comprising selecting said first security service to be a security service that is associated with a community other than that in which said user is enrolled.

17. The method of claim 1, further comprising selecting said first security service to be a security service that is associated with the community in which said user is enrolled.

18. A manufacture comprising a non-transitory and tangible computer-readable medium having encoded thereon instructions for causing a data-processing system to receive, at a communication server, a communication concerning a personal mobile handset that is coupled to a mobile communication system and that is associated with a corresponding user of said mobile communication system, said user having been enrolled as a member of a first community, said communication server having been configured to initiate communication with each security service from a set of security services and to cause said communication server to select a first security service from said set of security services based on a location from which said communication originated and to inform said first security service of said call.

19. The manufacture of claim 18, wherein said computer-readable medium is distributed such that instructions thereon are executed by different devices.

20. An apparatus comprising a communication server that is configured to receive a communication concerning a personal mobile handset that is coupled to a mobile communication system and that is associated with a corresponding user of said mobile communication system, said user having been enrolled as a member of a first community, said communication server having been configured to initiate communication with each security service from a set of security services and to cause said communication server to select a first security service from said set of security services based on a location from which said communication originated and to inform said first security service of said call.

* * * * *